United States Patent [19]

Cook

[11] 4,330,452

[45] May 18, 1982

[54] PLASTICIZERS FOR POLYVINYLCHLORIDE COMPRISING A REACTION PRODUCT OF ALKANEDICARBOXIC ACID AND ALKANOLETHER

[75] Inventor: Frank T. Cook, Baton Rouge, La.

[73] Assignee: The Dow Chemical Company, Midland, Mich.

[21] Appl. No.: 111,745

[22] Filed: Jan. 14, 1980

[51] Int. Cl.$^3$ .......................... C08K 5/05; C08K 5/06; C08K 5/10
[52] U.S. Cl. ..................................... 524/308; 524/569
[58] Field of Search ...................... 260/31.4 R, 30.4 R

[56] References Cited

U.S. PATENT DOCUMENTS

| | | | |
|---|---|---|---|
| 3,016,359 | 1/1962 | Wheeler et al. | 260/31.8 |
| 3,479,308 | 11/1969 | Gattenby et al. | 260/31.4 R |
| 3,533,974 | 10/1970 | Pultinas | 260/31.4 R |

FOREIGN PATENT DOCUMENTS 2329 6/1979 European Pat. Off.

*Primary Examiner*—Herbert J. Lilling
*Attorney, Agent, or Firm*—A. J. Young

[57] ABSTRACT

The use of a group of diester compounds that are particularly effective as plasticizers in polyvinylchloride-resin formulations and articles made therefrom. These compounds are the diesters of alkanedicarboxylic acids and alkanolethers. They are prepared by the direct esterification reaction of dicarboxylic acids with alkanolethers or by the trans esterification reaction of diesters with the corresponding alkanolethers.

4 Claims, No Drawings

PLASTICIZERS FOR POLYVINYLCHLORIDE COMPRISING A REACTION PRODUCT OF ALKANEDICARBOXIC ACID AND ALKANOLETHER

BACKGROUND OF THE INVENTION

This invention relates to plasticizers useful for preparing polyvinylchloride resin formulations. More particularly, the invention relates to the diesters of alkanedicarboxylic acids and alkanolethers.

It is known that certain esters of some dicarboxylic acids can be used as plasticizers for polyvinylchloride resins. This current known art comprises esters of the type:

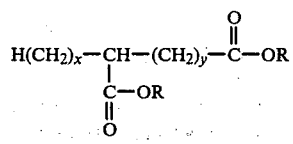

where x has a value between one and fifteen, y a value between one and fifteen, the sum of x and y is sixteen, and R is a benzyl, tetrahydrofurfuryl, or lower alkyl group.

It has now been unexpectedly discovered that the diesters of alkanedicarboxylic acids and alkanolethers can be used to prepare polyvinylchloride resin formulation which can be subsequently formed into finished products having improved physical properties. These esters are readily prepared by straightforward and well-known techniques such as direct or trans esterification.

SUMMARY

In general, this invention comprises the use of a group of diester compounds that are particularly effective as plasticizers in polyvinylchloride-resin formulations. These compounds are the diesters of alkanedicarboxylic acids and alkanolethers. They are prepared by the direct esterification reaction of the dicarboxylic acids with the alkanolethers or by the trans esterification reaction of diesters with the corresponding alkanolethers.

The use of this group of compounds in preparing polyvinylchloride-resin formulations comprises the steps of: (a) combining a polyvinylchloride resin with a diester derived from an alkanedicarboxylic acid and an alkanolether, and (b) processing the resulting mixture, thereby forming a polyvinylchloride-resin formulation.

This invention also provides articles made from such formulations, i.e., an article comprising a body, at least a portion of which includes a fused polyvinylchloride compound, wherein the polyvinylchloride compound comprises a polyvinylchloride resin and a plasticizer which is a diester derived from an alkanedicarboxylic acid and an alkanolether.

It is an object of this invention to provide plasticizers useful for preparing polyvinylchloride resin formulations which result in superior physical properties in the products made with the formulations. It is still another object of the invention to provide plasticizers useful for polyvinylchloride resins which are easily and economically prepared from the materials from which they are derived. These and other objects of this invention will be apparent to those skilled in the art from the description and example which follow hereinafter.

DESCRIPTION OF THE PREFERRED EMBODIMENTS

The following description illustrates the manner in which the principles of this invention are applied, but it is not to be construed as in any way limiting the scope of the invention.

More specifically, this invention provides plasticizers for polyvinylchloride resins which are the diesters of dodecanedicarboxylic acid and the following alkanolethers: 2-hydroxyethylmethyl ether, 2-hydroxyethylethyl ether, 2-hydroxyethylpropyl ether, 2-hydroxyethylisopropyl ether, 2-hydroxyethyltertiarybutyl ether, 2-hydroxyethyl-2'-methoxyethyl ether, 2-hydroxyethyl-2'-ethoxyethyl ether, 2-hydroxyethyl-2'-propoxyethyl ether, 2-hydroxyethyl-2'-isopropoxyethyl ether, and 2-hydroxyethyl-2'-tertiarybutoxyethyl ether. Preferably, the resin-plasticizer formulations comprise a composition of between about ten and about one-hundred parts of plasticizer per hundred parts of resin by weight, a stabilizer addition to the mixture of resin and plasticizer in an amount equivalent to between about one part and about four parts per hundred parts of resin by weight, and the resulting mixture is processed at a temperature between about 330° F. and about 400° F. to fuse the formulations into finished articles.

The practice of this invention is further illustrated by the following example.

EXAMPLE 1

A mixture comprising one-hundred grams of polyvinylchloride powder, forty grams of plasticizer, and two grams of a tin stabilizer was processed for ten minutes on a rollmill at 375° F. Coupons of the resulting fused formulations were then made from sheets pressed with a Pasadena hydraulics press. The conditions for making the sheets were two minutes under minimal pressure at 350° F., followed by four minutes under a ram force of five tons at 350° F., followed by four minutes under a ram force of twenty tons with cooling water being circulated. The coupons measured three hundred five millimeters long, by twenty-five and four tenths millimeters wide, by two and one quarter millimeters thick. The coupons were tested for tensile strength, 100% modulus, and percent elongation at break on a tensometer; and for hardness with a Shore A hardness tester. The rate of pull for the tensometer was twelve inches per minute.

The experimental results thus obtained are shown in Table I. Values of tensile strength were superior for the first three compounds, which were prepared with plasticizers falling within the scope of this invention, as compared with the last three compounds, which were prepared with plasticizers known in the art. Values of the other parameters were substantially the same for all of the compounds.

TABLE I

| Plasticizer Used | Tensile Strength (psi) | 100% Modulus (psi) | Percent Elongation | Hardness |
|---|---|---|---|---|
| $(CH_2)_{10}(COOC_2H_4OCH_3)_2$ | 2900 | 1150 | 310 | 73 |

TABLE I-continued

| Plasticizer Used | Tensile Strength (psi) | 100% Modulus (psi) | Percent Elongation | Hardness |
|---|---|---|---|---|
| $(CH_2)_{10}(COOC_2H_4OC_2H_5)_2$ | 3075 | 1450 | 349 | 79 |
| $(CH_2)_{10}(COOC_2H_4OC_2H_4OCH_3)_2$ | 2950 | 1250 | 320 | 77 |
| Dioctyl Phthalate | 2700 | 1400 | 315 | 80 |
| Dioctyl Sebacate | 2650 | 1600 | 340 | 79 |
| Diethyl Dodecanedicarboxylate | 2700 | 1100 | 310 | 74 |

While certain representative embodiments and details have been shown for the purpose of illustrating this invention, it will be apparent to those skilled in the art that various changes and modifications can be made therein without departing from the spirit and scope of the invention.

What is claimed is:

1. An article comprising a body, at least a portion of which includes a fused polyvinylchloride polymer and a plasticizer which is a diester reaction product formed by reacting an alkanedicarboxylic acid with an alkanolether, wherein the alkanolether is 2-hydroxyethylmethyl ether, 2-hydroxyethylethyl ether, 2-hydroxyethylpropyl ether, 2-hydroxyethylisopropyl ether, 2-hydroxyethyltertiarybutyl ether, 2-hydroxyethyl-2'-methoxyethyl ether, 2-hydroxyethyl-2'-ethoxyethyl ether, 2-hydroxyethyl-2'-propoxyethyl ether, 2-hydroxyethyl-2'-isopropoxyethyl ether, 2-hydroxyethyl-2'-tertiary-butoxyethyl ether, or a mixture thereof.

2. The article of claim 1 wherein the alkanedicarboxylic acid is dodecanedicarboxylic acid.

3. The article of claim 2 wherein the ratio of the plasticizer is between about ten and about one-hundred parts by weight per hundred parts by weight of polyvinylchloride polymer.

4. The article of claim 3 wherein a stabilizer is included with a ratio of between about one part and about four parts per hundred parts of polyvinylchloride polymer by weight.

* * * * *